Jan. 5, 1971   A. C. LEENHOUTS   3,553,549
DIGITAL MOTOR CONTROL CIRCUIT
Filed Sept. 11, 1968   2 Sheets-Sheet 1
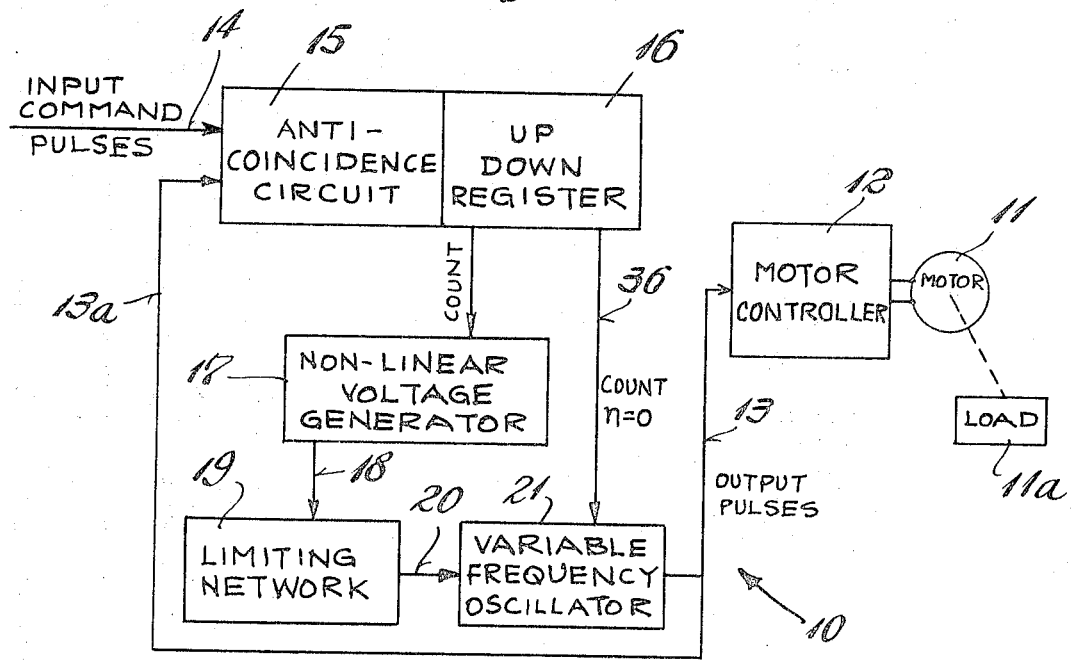
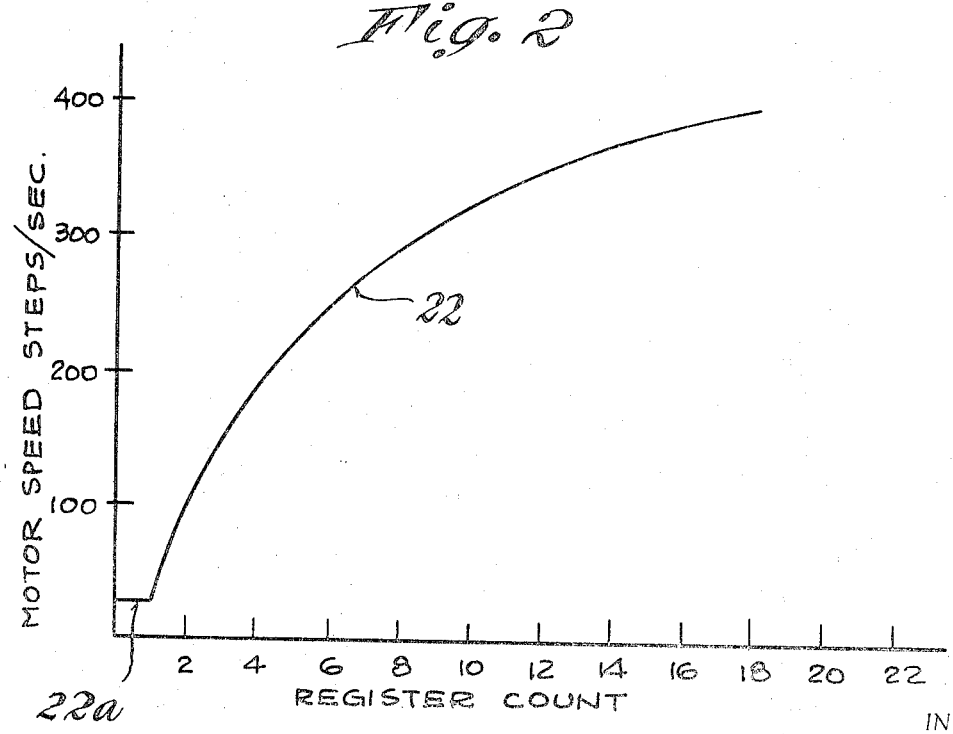
INVENTOR.
Albert C. Leenhouts
BY
Johnson and Kline
ATTORNEYS INVENTOR.
Albert C. Leenhouts
BY
Johnson and Kline
ATTORNEYS United States Patent Office 3,553,549
Patented Jan. 5, 1971

3,553,549
DIGITAL MOTOR CONTROL CIRCUIT
Albert C. Leenhouts, Granby, Conn., assignor to The Superior Electric Company, Bristol, Conn., a corporation of Connecticut
Filed Sept. 11, 1968, Ser. No. 759,004
Int. Cl. H02k 37/00
U.S. Cl. 318—138
8 Claims

ABSTRACT OF THE DISCLOSURE

A circuit for translating each input command pulse into an incremental step of a stepping motor in which the input pulses may be introduced into the circuit at one frequency and the motor stepped at another rate with the variation between the frequency and rate being in accordance with the difference between the number of input pulses and the number of steps and in which the stepping rate is controlled to be within the capability of the motor to move its load without loss or translation of each input pulse into a step.

---

Figure 4:
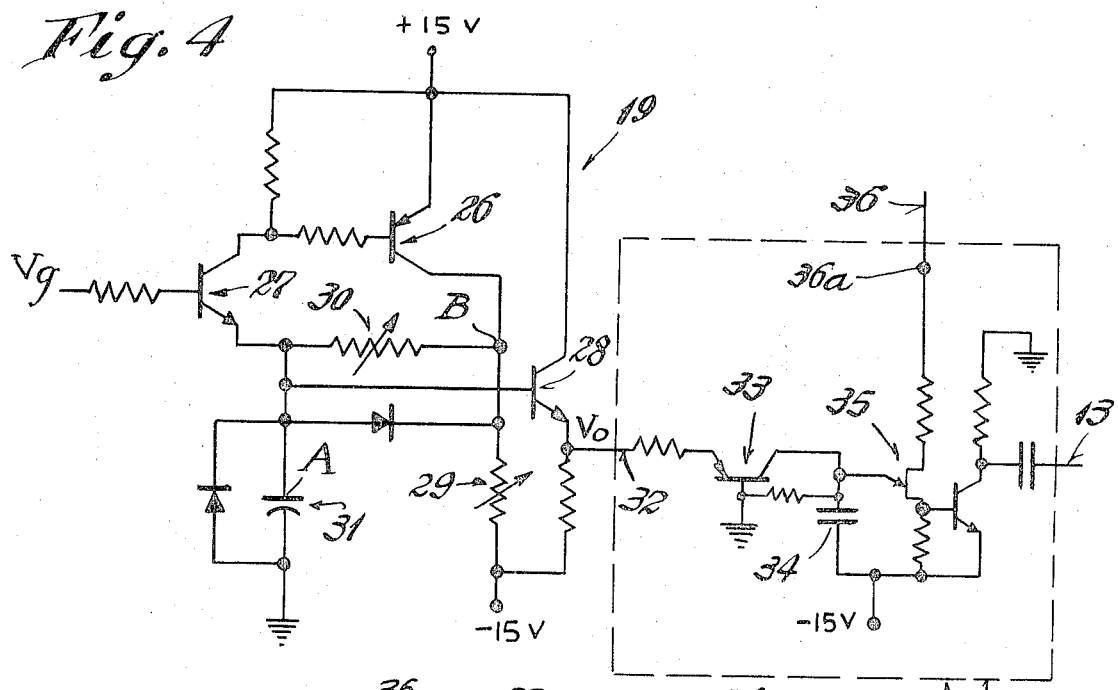

In U.S. Pat. No. 3,117,268, assigned to the assignee of the present invention, there is disclosed a stepping motor control circuit that accepts command input pulses and for each input pulse changes the energization of the stator windings of the motor. With each change of energization the motor will produce an increment or step of rotational movement. The control circuit will accept input pulses at any frequency and immediately produce a change in energization of the motor so that the motor will be required by its changes of energization to produce steps at a rate that is equal to the frequency of the input pulses.

In many instances this direct relationship between the frequency of the input pulses and the stepping rate has not been found to be satisfactory. One instance exists where the frequency of the pulses is at a rate which is faster than the motor's ability to respond and move its load one step for each pulse. For example, if the motor is at standstill and a train of input pulses at a frequency of 400 pulses per second occurs, the motor usually cannot instantly accelerate to 400 steps per second because of the inertia of the motor and its load. Thus the motor is apt not to take a step for each of the first few input pulses which accordingly destroys the wanted relation of the total number of motor steps being identical to the total number of input pulses. Another loss in identicalness of pulses and steps may occur when the frequency of the input pulses is altered substantially and the motor cannot instantly respond to change its rate to the new frequency of the input pulses.

It is accordingly an object of the present invention to provide a digital motor control circuit in which the frequency of the input command pulses and the stepping rate of the motor are not consistently identical but yet in which the motor will produce a step for each input pulse.

Another object of the present invention is to achieve the above object with a circuit which though causing the motor to be incrementally stepped for each input pulse varies the acceleration and deceleration stepping rate of the motor so that the rate is always within the ability of the motor to respond to each pulse by producing a step.

Still another object of the present invention is to provide a digital motor control circuit in which the stepping rate of the motor is digitally controlled in accordance with the number of input pulses which have not been translated into a step rather than in accordance with the frequency of the input pulses.

A further object of the present invention is to provide such a motor control circuit which though attaining the above objects is relatively simple in construction, durable in use and easily applied to existing motor control circuits.

In carrying out the present invention there is provided a stepping motor and a motor control, such as shown in the above-noted U.S. patent, with the motor control immediately translating each pulse received by it into a change of energization of the stator windings of the motor with each change producing a step. The input command pulses are not directly applied to the motor control but instead are received by a digital counter, such as an up-down register. The "count" in the register is utilized to vary the frequency of an oscillator that produces output pulses which are the pulses that are supplied to the motor control for translation into steps. The output pulses are also supplied to the up-down register but in a subtractive mode as opposed to the input pulses being in an additive mode, so that each input pulse will increase the count of the register by one while each output pulse will decrease the count by one. Accordingly the up-down regster maintains a count which is the instantaneous difference between the number of input pulses received and the number of output pulses supplied to the motor control.

The count in the register while controlling the frequency of the oscillator is limited in this control by the use of a change limiting network which regulates the rate of change of the frequency of the oscillator as controlled by the count. Particularly the limiting network is related to the motor inertia and the motor load with a preferred safety factor so that under no conditions of operation is the frequency of the oscillator capable of supplying pulses to the motor control at a rate which is greater than the ability of the motor control to accelerate and decelerate the motor and the load.

The count in the up-down register is indicative of the difference in the number of steps to be taken as commanded by the number of input pulses and the number of steps already taken as indicated by the output pulses. The count exists by reason of the difference between the frequency of the input pulses and the stepping rate. However, the motor will continue to be stepped until the count is zero and thus the motor will have taken the same number of steps as the number of input pulses.

Figure 3:
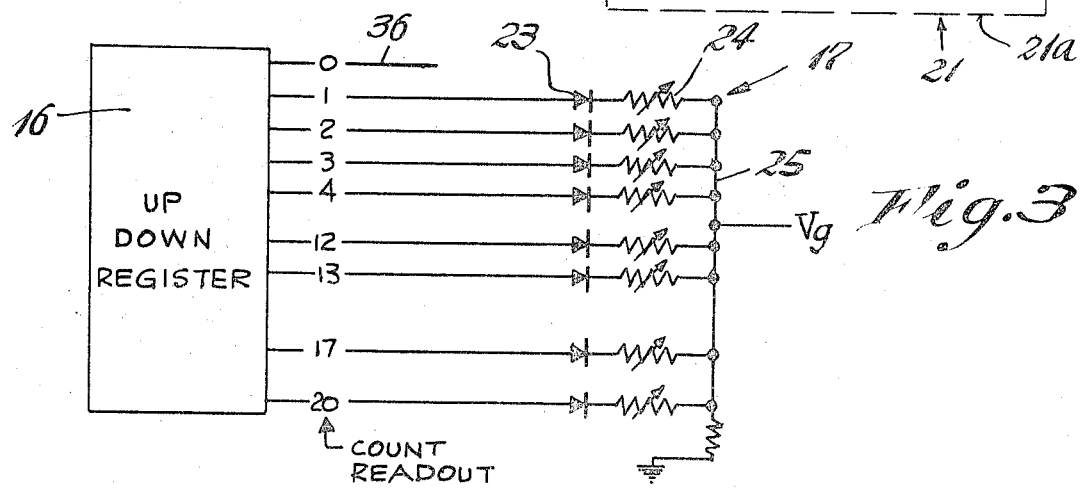
Figure 5:
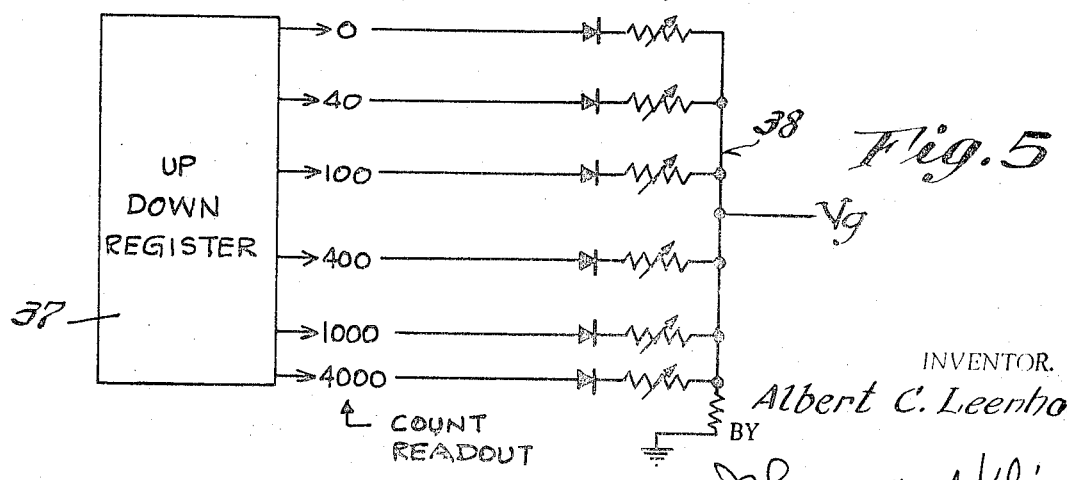

Other features and advantages will hereinafter appear.
In the drawings:
FIG. 1 is a block diagram of the motor control circuit of the present invention.
FIG. 2 is a graph of motor speed vs. register count.
FIG. 3 is a block and schematic diagram of the nonlinear voltage generator shown in FIG. 1.
FIG. 4 is an electrical schematic diagram of the limiting network and variable frequency oscillator.
FIG. 5 is a diagram similar to FIG. 3 of a further embodiment of a nonlinear voltage generator usable for higher stepping speeds.

Referring to the drawing, the digital motor control circuit of the present invention is generally indicated by the reference numeral 10 and includes a motor 11 and a motor controller 12. The controller and motor are fully disclosed in the above-noted U.S. patent and the motor controller will energize the motor windings with a change of energization which will cause the motor 11 to incrementally step one step for each output pulse received on a line 13. The translation between the output pulse and a change of energization to the motor to produce a step is substantially instantaneous.

In accordance with the present invention the motor 11 is caused to step the number of steps which are commanded by the number of input pulses on a line 14 but the rate of the changes of energization to the motor and hence its stepping rate is directed by the frequency of the output pulses rather than the frequency of the input pulses. Thus the motor rate is not at all times positively and directly related to the frequency of the input pulses but yet at times there may be coincidence.

The input command pulses are introduced on the line 14 into an anti-coincidence circuit 15 as are also output pulses on a line 13a. Both pulses are fed to an up-down register 16 such that each input command pulse increases the count of the register by one and each output pulse decreases the count of the register by one. The anti-coincidence circuit is used to assure that each pulse will be counted by the register and thus prevent loss of the counting of a pulse if both an output pulse and an input pulse should occur simultaneously.

The count of the register which is the instantaneous difference between the number of input and output pulses, is directed to a nonlinear voltage generator 17 that produces a voltage in a line 18 which is related to the count of the register. The voltage in line 18 is supplied to a limiting network 19 which produces a voltage in a lead 20 to a variable frequency oscillator 21. The output of the oscillator 21 is the output pulses that appear in the leads 13 and 13a. Accordingly, the count of the register 16 is reduced to an analog voltage value which through the limiting network 19 is applied to the variable frequency oscillator 21 to control the frequency of the oscillator and hence the frequency of the output pulses.

One relationship between the register count and the motor speed (which is identical with the output pulse frequency) is shown in FIG. 2 wherein the maximum motor stepping rate is approximately 400 steps per second and occurs when the register has a count of about 20. The maximum frequency of the input pulses thus is also 400 pulses per second as its average frequency cannot exceed the maximum motor speed when the counter is full. The motor 11 is connected to a load 11a and by reason of its own and the load's inertia has a rate of velocity change of which it is capable without loss of a step. This rate of velocity change and the count of the counter which is determined by the input pulse frequency and the output pulse frequency are all related in view of time being a common unit in all three factors. Thus as the input pulses cause the counter to increase its up count (more input pulses than output pulses), the variable frequency oscillator will cause the motor rate to increase along the line indicated by reference numeral 22.

Assuming that the motor is still and that input command pulses are supplied at a frequency of 400 pulses per second, the limiting network 19 will control the variable frequency oscillator 21 so that the frequency of the output pulses supplied to the motor controller 12 will be as indicated by the line 22. Accordingly for the first input pulse there will be a first output pulse 13 which is produced at the rate of about 33 steps per second. While taking this step, more input command pulses will be supplied to the register causing the count to substantially increase which in turn through the limiting network 19 increases the rate of the variable frequency oscillator so that if the register count is 4 the motor rate will be approximately 200 steps per second. The motor will increase its stepping rate until the maximum count of about 20 is reached when the motor will be stepping at a rate of 400 steps per second which is both the maximum stepping rate and the maximum average input pulse frequency.

When the input pulses terminate, the variable frequency oscillator will be caused to produce pulses at a decreasing rate along the line 22 as the register count decreases to zero. Thus every input pulse is either instantaneously offset by an output pulse or is stored in the register 16 so that every input pulse will produce a change of energization or step of the motor. Moreover, as the register count increases or decreases, it controls, subject to the limiting network, the rate at which the motor steps.

The exact shape of the curve 22 depends on the motor 11 and load 11a and could change with different motors, loads, speeds, etc. It is determinable by computation or experiment. Preferably there is also a safety factor involved so that the curve 22 will be well within the ability of the motor so that there will be assurance that every output pulse will be converted into a motor step.

Referring to FIG. 3, there is shown the nonlinear voltage generator 17 which is connected to the up-down register 16 by the register 16 having a count readout of counts 1–20. Each readout is connected, as for example the count 1, through a diode 23 and a variable resistor 24 to a common lead 25 which is indicated by the reference character $V_g$ denoting voltage from the voltage generator. The variable resistors 24 are adjusted to correspond with the curve 22 and thus each count of the register 16 will provide a different value of $V_g$ voltage with the higher the count, the higher the voltage.

In FIG. 4, the $V_g$ voltage is applied as shown to the input of the limiting network 19. This network includes transistors 26, 27 and 28, two variable resistors 29 and 30, a capacitor 31 and the various other diodes and resistances shown. The output of the limiting network is a voltage $V_o$ in a line 32. In the operation of the network 19, the value of $V_g$ will vary from zero to plus 10 volts for zero and maximum count respectively. As its value increases, it will increase conduction of transistor 27 which in turn causes an increase in conduction in transistor 26 by their being connected in a high gain emitter-follower configuration. Increased conduction of transistor 26 increases the positive potential at a point B which through the variable resistor 30 serves to increase the positive charge on the condenser 31 at the point A at a rate determined by the RC network of the components 30 and 31. As the charge at point A increases, it will tend to decrease conduction of transistor 27 until transistor 27 is rendered nonconducting by the charge at point A being substantially equal to the value of $V_g$ which also turns off transistor 26. Transistor 28 is connected in an emitter-follower configuration to the point A, so that $V_o$ in line 32 is essentially related to the value of the charge at point A which again is essentially related to the value of $V_g$ except for the time delay introduced by the limiting network.

When $V_g$ decreases in value, the charge at A is also decreased but at a rate determined by the resistor 29 until the system achieves a balance condition when the charge at point A will equal value of $V_g$. However, in both instances there is a delay whenever a change in the value of $V_g$ occurs.

The lead 32 having the voltage $V_o$ is connected to the variable frequency oscillator 21 that is included within the dotted line 21a and is essentially a unijunction transistor oscillator. The value of the voltage $V_o$ controls the degree of conduction of a transistor 33 which in conjunction with a condenser 34 serves to control the rate of conduction of a unijunction transistor 35. Each time the transistor 35 conducts an amplified output pulse appears on the lead 13.

As shown in FIG. 1, there is a lead 36 connected between the register 16 and the oscillator 21 and this lead places a 15 volt voltage on the terminal 36a when the count is zero and a zero voltage thereon when the count is not zero. With a zero count, the potential across the condenser is insufficient to effect conduction of the transistor 35 because of the high base to base transistor voltage but when the first input pulse is counted by the register 16, the base to base voltage decreases to a value which enables the condenser 34 to effect conduction. Thus the first pulse on the output lead 13 will occur substantially instantaneously with the input pulse to the register when the count readout is zero. This is shown at portion 22a of courve 22 in FIG. 1 and sets the minimum stepping rate of the motor.

With the above structure, it will be understood that the input command pulses are effectively frequency isolated from the output pulses which control the motor stepping rate and that the stepping rate of the output pulses is within the capability of the motor to assuredly step one step for each output pulse. However, the number of the output pulses or steps will always be numerically equal to the number of input pulses and thus irrespective to the frequency of the input command pulses (within the maximum stepping ability of the system) there will always be produced a change in energization and step of the motor.

In the heretofore disclosed embodiment of the up-down register 16 shown in FIG. 3, the maximum count readout was indicated as being about 20. While this is acceptable for relatively slow speed stepping motors, if it is desired to utilize the herein disclosed circuit with a motor that is capable of having a stepping speed of 4000 or more steps per second a circuit such as shown in FIG. 5 may be employed. The only difference existing between the embodiment shown in FIG. 5 and the previously described embodiment is that the register has a larger count perhaps 4000 and the count readout therefore is taken from only selected counts of different magnitude.

The register 37 as shown in FIG. 5 has count readouts of counts greater than 0, and greater than or equal to 40, 100, 400, 1000 and 4000 with each readout being connected through a diode and variable resistor to a line 38 denoted $V_g$ which corresponds to the line 25 and is connected to the oscillator 21. The value of the $V_g$ voltage will be that set by the highest count readout which the register has. As such, it will cause the oscillator to supply output pulses at a frequency correlated thereto by taking into account the stepping capability of the motor and the register count. While only a few count readouts have been shown, more could be utilized if desired.

It will accordingly be understood that there has been disclosed a stepping motor control circuit which produces a step for each input pulse received. The rate of stepping is essentially independent of the frequency of the input pulses and is set to be within the capability of the motor to assuredly respond to a change of energization to move a step. This is achieved by the rate of changes of energization to the motor being obtained from a variable frequency oscillator which produces output pulses that have a frequency that is related to the instantaneous difference between the number of input pulses and the number of output pulses controlled, however, by a network which limits the rate of change of the frequency of the output pulses.

Variations and modifications may be made within the scope of the claims and portions of the improvements may be used without others.

I claim:

1. A digital motor control circuit for providing a change of energization to a stepping motor to produce an incremental step for each input command pulse received comprising means for accepting input pulses, oscillator means for producing output pulses, means for receiving the output pulses and producing a change of energization to the motor for each output pulse with said motor having a speed determined solely by the frequency of the output pulses, and means for controlling the frequency of the oscillator means in accordance with the difference between the number of input pulses and the number of output pulses and in which said motor has a finite speed at which it can produce an incremental step for each change of energization and wherein said frequency of output pulses is made to be no larger than to produce the finite speed whereby said motor will produce an incremental step for each input command pulse by being caused to have a speed no larger than its finite speed irrespective of the frequency of the input command pulses below the maximum finite speed of the motor.

2. The invention as defined in claim 1 in which the frequency controlling means includes means for maintaining the instantaneous count of the difference between the number of input pulses and the number of output pulses and for supplying a signal related to the value of the count for controlling the frequency of the oscillator means.

3. The invention as defined in claim 1 in which the frequency controlling means includes means for limiting the rate of change of the frequency of the output pulses whereby the rate of changes of energization to the motor is within the ability of the motor to respond to each change of energization.

4. A digital motor control circuit for providing an incremental movement of a stepping motor for each input pulse received of a train of pulses comprising means for accepting input pulses, means for providing a change of energization of the motor with each change producing an incremental movement of the motor with the motor having a speed determined solely by the frequency of the output pulses, and means for varying the rate of the changes of energization with respect to the frequency of the input pulses but with there being one change of energization for each input pulse and in which the motor has the ability to convert each change of energization into an incremental step below a determinable limit in the speed of varying the rate of changes of energization and in which the varying means includes means to prevent altering the speed of varying the rate from exceeding the determinable limit.

5. The invention as defined in claim 4 in which the determinable limit is correlated to the rate of changes of energization so that the limit of the speed of varying changes with the rate and in which the preventing means is also correlated to the rate of changes of energization and alters its preventing in accordance with the limit of the speed of varying.

6. The invention as defined in claim 4 in which the varying means includes counter means for maintaining an instantaneous count of the difference between the number of input pulses and the number of changes of energization.

7. The invention as defined in claim 6 in which the counter means includes a plurality of count readouts indicative of the count, in which the varying means further includes oscillator means for controlling the rate of the changes of energization and in which the count readout substantially controls the rate of the oscillator means.

8. The invention as defined in claim 7 in which the varying means includes means for limiting the speed of the change in rate of the oscillator means as called for by the counter means.

References Cited
UNITED STATES PATENTS

| | | | |
|---|---|---|---|
| 3,278,817 | 10/1966 | Johnson et al. | 318—(20.110) |
| 3,344,260 | 9/1967 | Lukens II | 318—(20.110) |
| 3,374,410 | 3/1968 | Cronquist et al. | 318—254 |
| 3,411,058 | 11/1968 | Madsen et al. | 318—138 |
| 3,418,547 | 12/1968 | Dudler | 318—(20.110) |
| 3,428,792 | 2/1969 | Kelling | 318—(20.110) |

GLEN R. SIMMONS, Primary Examiner

U.S. Cl. X.R.

318—18